Sept. 28, 1954     T. L. KENDALL     2,690,467

VENT PLUG

Filed Feb. 17, 1953

INVENTOR.
Thomas L. Kendall
BY
His Attorneys

Patented Sept. 28, 1954

2,690,467

UNITED STATES PATENT OFFICE 2,690,467

VENT PLUG

Thomas L. Kendall, Muncie, Ind., assignor to General Motors Corporation, Detroit, Mich., a corporation of Delaware Application February 17, 1953, Serial No. 337,303

3 Claims. (Cl. 136—178)

This invention relates to vent caps for storage batteries and is particularly concerned with the submersible type of vent caps which will permit submerging of the battery without damage thereto.

The main feature of the invention is, therefore, to provide a storage battery vent cap for a battery cell which will permit egress of gases from the cell but which will prevent ingress of air, water or the like into the cell whereby the cell may be submerged without harming its future function.

Another feature of the invention is to provide a vent cap having a valving means therein which is readily opened to permit the egress of gases from the battery but which is closed by gravity to prevent ingress of fluids external of the battery, this valving means being freely movable within the vent cap and limited in its opening movement by portions of the vent cap. This valving means is removable so that the cap may be converted to a conventional unvalved type of vent cap when desired.

A further feature of the invention is to modify a storage battery vent cap so that it may be converted to a submersible type of vent cap wherein valve means included therein will permit submersion of a battery without damage thereto. This conversion is accomplished by providing a removable cover for a chamber in the cap whereby a movable valve means may be inserted into or removed from the interior chamber of the vent cap. The valve means used with the cap comprises a disk and oppositely disposed plugs positioned thereon. The plugs which serve respectively as a guide and stop means for the valve, are dimensioned and arranged to permit the valve to alternately unseat and permit egress of gases from within the battery and to seat for preventing ingress of external fluids therein. The removable cover serves to close one end of a chamber of the vent cap and acts as a baffle for gases passing from the battery to a partially closed vent notch provided in a wall of the vent cap.

Further objects and advantages of the present invention will be apparent from the following description, reference being had to the accompanying drawings wherein a preferred embodiment of the present invention is clearly shown.

Storage batteries, as used commercially, normally include a plurality of cell containers that are each closed by a vent cap. These vent caps permit escape of gases formed during charging of the battery whereby the internal pressure within each cell is maintained at substantially atmospheric pressure. In marine applications, and for that matter in numerous other applications, storage batteries are often subjected to submersion in water due to the fact that the vehicle in which they are contained is submerged. When this occurs, water seeps into the cells through the vent of the conventional type of cap. The feature of the present invention is to provide a vent cap which will permit submersion of a storage battery cell without permitting the harmful ingress of external fluids into the cell, which vent cap, will however, allow venting of the cell to prevent excessive gas pressure from forming therein. Furthermore, the present vent cap, as described herein, is applicable for use in connection with any type of storage battery since the cap is of a screw variety and is adapted to be easily converted to a standard or submersible type vent cap by merely removing or inserting a valve means through an opening formed when a cover for the cap is temporarily removed.

Figure 1:
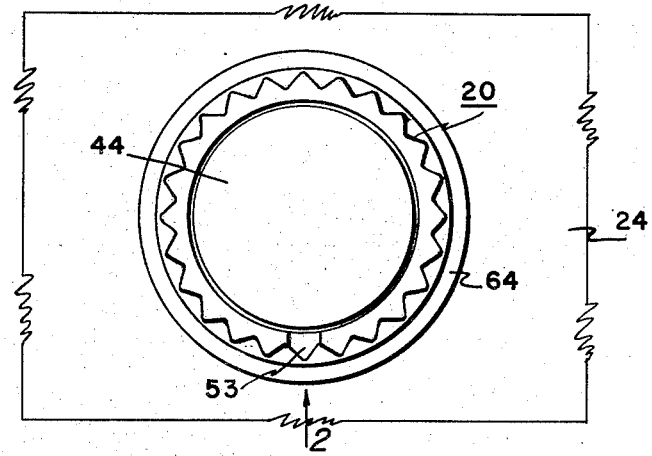
Fig. 1 is a plan view of a vent cap embodying one form of the present invention.
Figure 2:
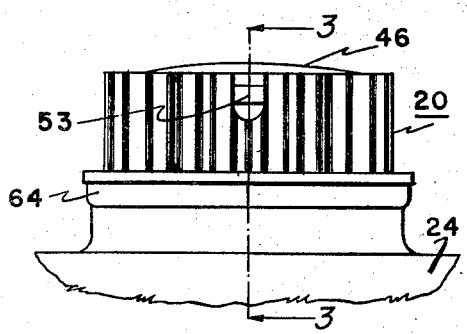
Fig. 2 is a side view of a vent cap in the direction of arrow 2 in Fig. 1.
Figure 3:
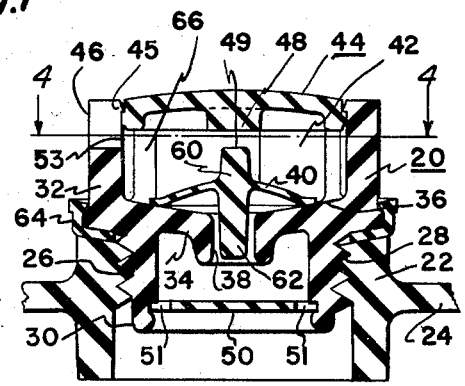
Fig. 3 is a cross sectional view along line 3—3 in Fig. 2.
Figure 4:
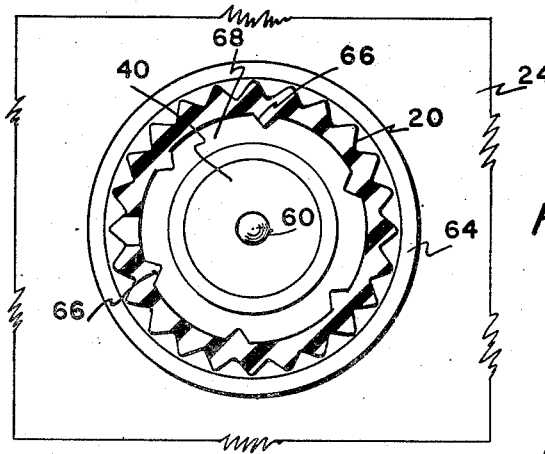
Fig. 4 is a cross sectional view along line 4—4 in Fig. 3.

Referring specifically to Fig. 3, one embodiment of the invention is shown wherein a vent cap 20 is shown as assembled to a threaded filler opening 22 of a battery cell casing 24 (shown in part). The filler opening 22 is threaded at 26 to engage threads 28 preferably molded into a plug or skirt portion 30 of the cap. A main body portion 32 is provided on the cap which presents a cross wall 34 that separates the cap 20 into two compartments, one formed by the elongated threaded portion 30 and the other formed by the body portion 32. The upper face of the wall 34 forms an annular seat 36 which surrounds an aperture 38 that passes through the wall 34. A valve disk 40 provided within cavity 42, is preferably circular in shape and has less diameter than the cavity 42 formed in the body portion 32, so that it is freely movable therein. The cavity 42 is closed by cover 44 which is constructed and arranged so as to be engaged by a relatively small annular ridge 45 formed on the wall of the cavity 42. An aperture or groove 46 formed in body portion 32 of the cap is of sufficient depth that upon engagement of cover 44 with the ridge 45 a continuous opening 53 is provided to serve as a vent means for the top chamber of the vent cap. Guide ridges 66 are also provided on the peripheral walls of cavity 42. These ridges 66 are adapted to play a dual role in the present invention as they first serve as a guide means for the valve 40 during its movement while permitting the passage of gases therearound, and secondly the ends thereof are spaced from rim 45 so as to act as a stop for cover 44 for limiting the insertion thereof into cavity 42. This construction permits the cover 44 to be easily inserted in position over rim 45 as the body portion 32, covers 44 and 45 while being sufficiently resilient to permit the necessary temporary deformation thereof for permitting the snapping of the cover 44 into position. The removal of the cover 44 over rim 45 is also readily accomplished by a pointed instrument being inserted through opening 53 so as to engage the bottom surface of the cover 44 whereby the cover may be pried or snapped from its seated position.

The threaded portion or skirt 30 is closed at its lower end by an apertured disc or baffle 50. This disc is used to baffle spray so that no direct spray enters the aperture 38, although gases may freely pass through the apertures 51 in the disc 50 which are either notches in the edge or holes drilled out of line with the aperture 38. Baffle 50 is press fitted into the skirt portion 30 so that it preferably snaps into a groove and is held in place therein.

The valve 40 is provided with two plugs 60 and 62 extending from the opposite sides thereof. Plug 62 is adapted to be inserted in aperture 38 and is dimensioned to have sufficient clearance to permit free passage of gases thereabout but in sufficient clearance to permit the valve 40 to become misaligned. The extending plug 60 serves as a limiting stop means for the upward movement of the valve as the plug engages the bottom surface of cover 44.

In a modification of the cover as shown in dotted lines in Fig. 3 an abutment 48 may be included on the cover 44 if desired. The abutment if included merely serves as an additional stop means and when present will permit the length of plug 60 to be reduced.

In general, various parts are constructed and arranged so that valve 40 cannot become jammed in aperture 38 any time nor can it become disengaged since the cover 44 limits the upward movement of the valve. It is apparent that plug 62 in combination with guide means 66 will constantly maintain the valve in alignment. In this connection it is to be noted that the submersive valve cap shown and disclosed is somewhat similar to the valve cap disclosed in Kendall et al. Ser. No. 251,678 which is assigned to the assignee of the present invention. The structure as disclosed in the present invention may be distinguished from that of Kendall et al. application in that it is directed to a submersible valve cap embodying a stop means formed integrally with the valve and having a removable cover whereby the submersible type vent cap can be converted to the conventional type. It is also manifest that an annular gasket 64 is preferably provided to assure sealing of the vent cap 20 to the casing 24.

The vent cap may be made from any suitable material such as hard rubber, thermosetting resins or polyethylene of suitable hardness, or for that matter any of the conventional materials heretofore used in vent caps. The basic feature of the invention is directed to the valve mechanism and a removable cover for the cap rather than to the material or external construction thereof. The valve disc 40 is preferably fabricated from a softer material than the remainder of the assembly thereby improving the sealing qualities of the valve to its seat. Suitable elastomers which will withstand acid, oxidation and a reasonable degree of heat may be used, some of these being rubbery materials, natural or synthetic, polyethylene etc. provided they meet with the aforementioned requirements. It is readily apparent that a vent cap made in accordance with the present invention is adapted for easy repair or conversion to either a conventional or submersible type vent cap. This feature is particularly desirable during the manufacture of batteries in that the cap can be manufactured and the valving means included or omitted depending upon the customer requirements. It is further apparent that the cover for the cap is easily removed by merely inserting a tool through aperture 46 in the body portion 32 whereby the cover may be easily pried from its peripheral supporting rim 45. Thus, when the cover has been removed easy access to the valve portion is possible for the repair, cleaning or modification thereof.

While the embodiments of the present invention as herein disclosed constitute a preferred form, it is to be understood that other forms might be adopted.

What is claimed is as follows:

1. A submersible vent cap for use in connection with storage batteries for closing apertured cell covers of individual battery cells comprising, in combination; a body member having an apertured wall separating chambered upper and lower portions thereof, the lower portion of said cap adapted to sealingly engage a cell cover when the cap is positioned within an aperture therein, a plurality of guide ridges on the walls of said upper chamber, a valve means in the upper chambered portion of said cap adapted to seal on one surface only of said apertured wall, said valve means including; a removable disk having oppositely disposed extending plugs thereon, one of which is adapted for unimpeded passage through the apertured wall with sufficient clearance to permit passage of gas therearound and also to act as a guide for said disc and the other of which is adapted to act as a stop, said plugs being so dimensioned that when said valve means is inserted within the cap that the stop plug prevents displacement of the guide plug from the aperture in said wall whereby the valve disc is capable of being guided by said guide ridges for permitting egress of battery gases from the battery cell and of sealing the battery cell against ingress of fluids external of the battery.

2. The vent cap as claimed in claim 1 wherein the body member has a vent means formed in a wall on one end thereof said vent means comprising; a notch in a wall in the upper chamber within said body member, and a removable cover for said upper chamber within the body, said notch and cover being constructed and arranged for providing an opening in said wall after a portion of said notch is closed by the cover and for permitting assembly and disassembly of said valve means in said chamber when said cover is removed from said cap by a pointed instrument when said instrument is inserted through said opening.

3. The vent cap as claimed in claim 1 wherein a cover is provided for the upper chambered portion of said body member, said cover being adapted for engaging the guide ridges on the walls of said body for maintaining said cover in position and having a stop means formed on the central portion of said cover for engaging a plug acting as a stop on a valve and thereby limit the movement of said valve within said upper chamber.

References Cited in the file of this patent
UNITED STATES PATENTS

| Number | Name | Date |
|---|---|---|
| 1,190,654 | Kammerhoff | July 11, 1916 |
| 2,351,177 | Younkman | June 13, 1944 |
| 2,571,893 | Kendall | Oct. 16, 1951 |